US008018524B2

(12) United States Patent
Kawarada (10) Patent No.: US 8,018,524 B2
(45) Date of Patent: Sep. 13, 2011

(54) IMAGE-PICKUP METHOD AND APPARATUS HAVING CONTRAST AND PHASE DIFFERENCE FORCUSING METHODS WHEREIN A CONTRAST EVALUATION AREA IS CHANGED BASED ON PHASE DIFFERENCE DETECTION AREAS

(75) Inventor: Masahiro Kawarada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 12/259,476

(22) Filed: Oct. 28, 2008

(65) Prior Publication Data
US 2009/0115882 A1 May 7, 2009

(30) Foreign Application Priority Data
Nov. 2, 2007 (JP) ................................. 2007-285972

(51) Int. Cl.
G03B 13/36 (2006.01)
G03B 13/34 (2006.01)
(52) U.S. Cl. ......... 348/350; 396/100; 396/123; 348/353
(58) Field of Classification Search .................. 348/350; 396/100, 123
See application file for complete search history.

(56) References Cited

U.S. PATENT DOCUMENTS

| 6,470,148 | B2 * | 10/2002 | Ide et al. ........................... 396/80 |
| 6,597,868 | B2 * | 7/2003 | Suda .............................. 396/111 |
| 6,829,008 | B1 * | 12/2004 | Kondo et al. ................... 348/302 |
| 7,565,072 | B2 * | 7/2009 | Ito ................................. 396/121 |
| 7,728,903 | B2 * | 6/2010 | Ohnishi ......................... 348/345 |
| 7,742,693 | B2 * | 6/2010 | Kobayashi ...................... 396/91 |
| 7,751,700 | B2 * | 7/2010 | Kusaka ........................... 396/79 |
| 7,844,173 | B2 * | 11/2010 | Fujii .............................. 396/121 |
| 7,844,176 | B2 * | 11/2010 | Kunishige et al. ............. 396/128 |
| 7,873,267 | B2 * | 1/2011 | Kusaka ........................... 396/104 |
| 2002/0003958 | A1 * | 1/2002 | Nagata ........................... 396/106 |
| 2002/0150308 | A1 * | 10/2002 | Nakamura ..................... 382/286 |
| 2004/0169767 | A1 * | 9/2004 | Norita et al. ................... 348/350 |
| 2008/0278618 | A1 * | 11/2008 | Matsumoto et al. .......... 348/345 |
| 2009/0153720 | A1 * | 6/2009 | Suzuki et al. ............. 348/333.01 |
| 2010/0214452 | A1 * | 8/2010 | Kawarada ..................... 348/255 |
| 2011/0008031 | A1 * | 1/2011 | Kusaka ........................... 396/100 |
| 2011/0058097 | A1 * | 3/2011 | Mizuo ............................ 348/350 |

FOREIGN PATENT DOCUMENTS

JP 2000-156823 6/2000
JP 2001-305415 10/2001

* cited by examiner

Primary Examiner — W. B. Perkey
Assistant Examiner — Bret Adams
(74) Attorney, Agent, or Firm — Cowan, Liebowitz & Latman, P.C.

(57) ABSTRACT

The image-pickup apparatus includes an image-pickup element including first type pixels photoelectrically converting an object image formed by a light flux from an optical system and second type pixels photoelectrically converting plural images formed by plural light fluxes divided from the light flux from the optical system, a controller performing contrast detection focus control using signals from pixels in a contrast evaluation area among the first type pixels, and a detector detecting phase differences of respective pairs of images of the plural images using signals from the second type pixels, the pairs of images being respectively formed in plural phase difference detection areas in the contrast evaluation area, and calculating information on an in-focus position of the optical system or object distance for each phase difference detection area based on each phase difference. The controller changes the contrast evaluation area based on the information calculated for the respective phase difference detection areas.

8 Claims, 8 Drawing Sheets

— FINAL CONTRAST EVALUATION VALUE
— — — CONTRAST EVALUATION VALUE FOR FIRST OBJECT
— · — · — · CONTRAST EVALUATION VALUE FOR SECOND OBJECT

IMAGE-PICKUP METHOD AND APPARATUS HAVING CONTRAST AND PHASE DIFFERENCE FORCUSING METHODS WHEREIN A CONTRAST EVALUATION AREA IS CHANGED BASED ON PHASE DIFFERENCE DETECTION AREAS

BACKGROUND OF THE INVENTION

The present invention is related to an image-pickup apparatus such as a digital still camera or a video camera, and is specifically related to an image-pickup apparatus which uses image-pickup pixels and focus detection pixels in an image-pickup element to perform focus control with a contrast detection method.

Japanese Patent Laid-Open No. 2000-156823 discloses an image-pickup apparatus, in which some pixels (focus detection pixels) included in an image-pickup element used in the apparatus are provided with different optical characteristics from those of other pixels to perform focus detection based on outputs from the focus detection pixels.

Figure 9:
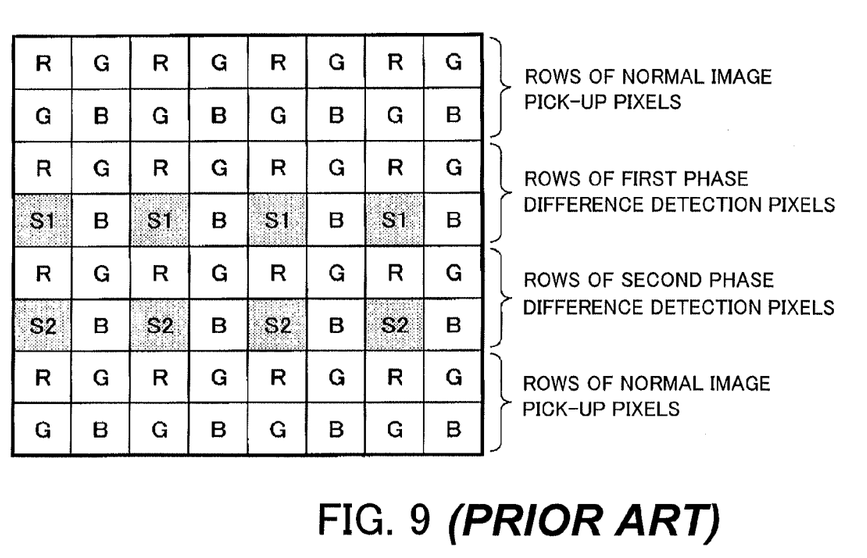
FIG. 9 is a figure showing an example of conventional arrangement of the image-pickup pixels and the focus detection pixels.

In the image-pickup apparatus disclosed in Japanese Patent Laid-Open No. 2000-156823, plural focus detection pixels paired with each other are arranged in part of the image-pickup element. FIG. 9 shows one example of a pixel arrangement of the image-pickup element in which the focus detection pixels are arranged in some of the lines of the pixel matrix.

In FIG. 9, reference symbols R, G, and B respectively represent normal image-pickup pixels provided with a red filter, a green filter, and a blue filter. Reference symbols S1 and S2 respectively represent a first focus detection pixel and a second focus detection pixel (phase difference detection pixels) which have different optical characteristics from those of the image-pickup pixels.

Figure 10:
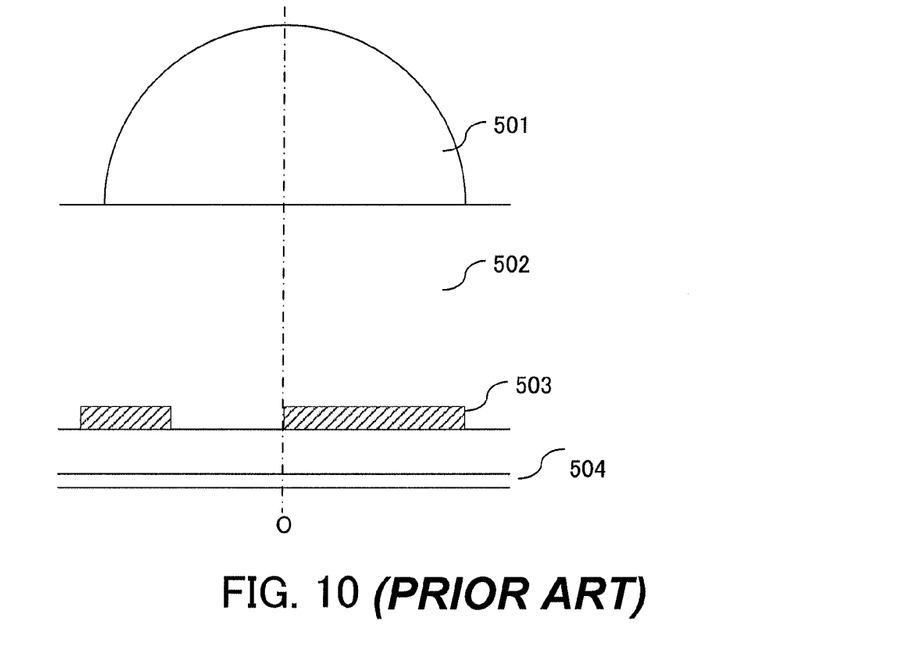
FIG. 10 is a figure showing the structure of a first focus detection pixel.

FIG. 10 shows the structure of a first focus detection pixel S1. In FIG. 10, a microlens 501 is formed on a light-entrance side of the first focus detection pixel. Reference numeral 502 denotes a planar layer forming a flat surface for providing the microlens 501.

Reference numeral 503 denotes a light-shielding layer, which has an aperture decentered to one direction relative to the center O of a photoelectric conversion area 504 of the first focus detection pixel S1.

Figure 11:
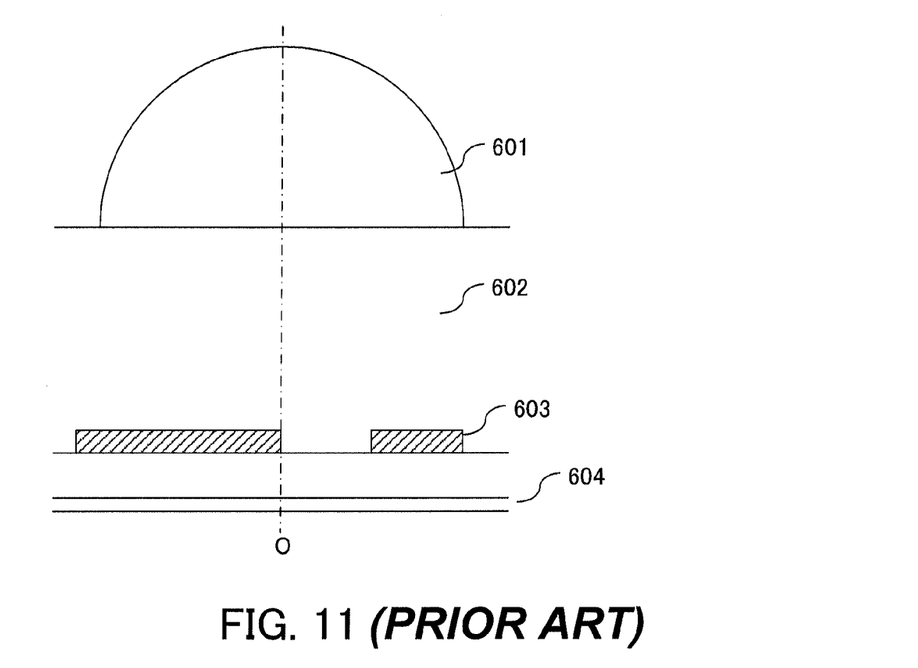
FIG. 11 is a figure showing the structure of a second focus detection pixel.

FIG. 11 shows the structure of a second focus detection pixel S2. In FIG. 11, a microlens 601 is formed on a light-entrance side of the second focus detection pixel. Reference numeral 602 denotes a planar layer forming a flat surface for providing the microlens 601.

Reference numeral 603 denotes a light-shielding layer, which has an aperture decentered relative to the center O of a photoelectric conversion area 604 of the second focus detection pixel S2. The aperture of the light-shielding layer 603 is decentered in a direction opposite to that of the light-shielding layer 503 provided in the first focus detection pixel S1. That is, the light-shielding layers 503 and 603 have their apertures at symmetric positions relative to the optical axis of the microlenses of the first and second focus detection pixels S1 and S2.

With such a structure, viewing an image-pickup optical system from the first focus detection pixel S1 and from the second focus detection pixel S2 is equivalent to symmetrically dividing a pupil of the image-pickup optical system.

In FIG. 9, in the line containing the first focus detection pixels S1 and in the line containing the second focus detection pixels S2, two images (pair of images) are formed which are more approximate to each other as the number of pixels in the image-pickup element increases. When the image-pickup optical system is in an in-focus state relative to an object, outputs (image signals) obtained from the lines respectively containing the first and second focus detection pixels S1 and S2 match with each other.

On the other hand, when the image-pickup optical system is out of focus, a phase difference is generated in the image signals obtained from the lines respectively containing the first and second focus detection pixels S1 and S2. Directions of the phase difference in a front focus state and in a rear focus state are opposite to each other.

Figure 12A:
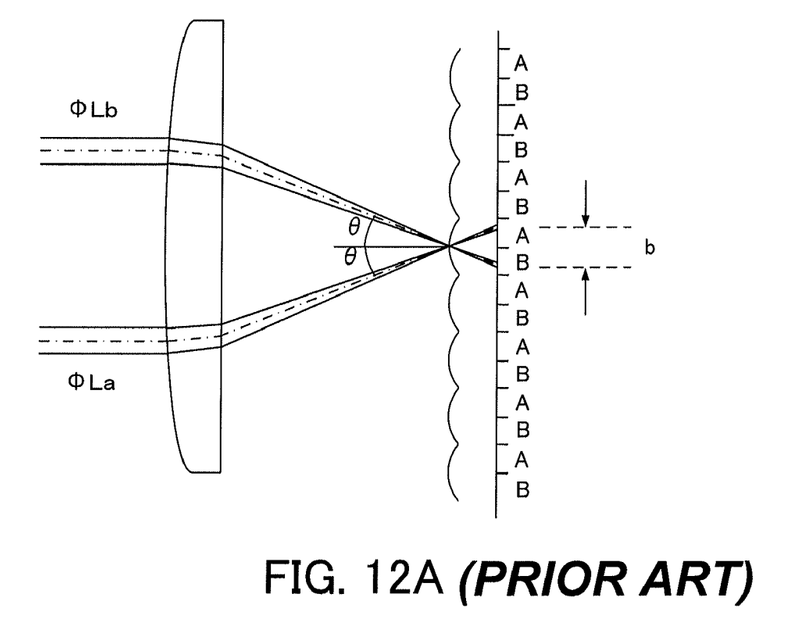
FIG. 12A is a schematic view for explaining a phase difference of image signals in an in-focus state.
Figure 12B:
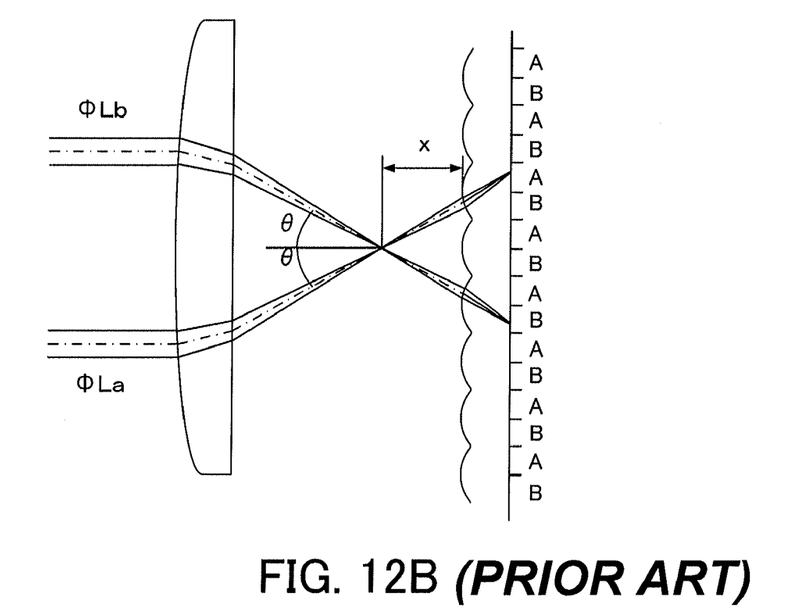
FIG. 12B is a schematic view for explaining the phase difference of the image signals in a front focus state.

FIGS. 12A and 12B show the relationships between the focus state and the phase difference. In these drawings, the focus detection pixels S1 and S2 are illustrated closer to each other and designated by symbols A and B. The image-pickup pixels are omitted.

The light flux from a specific point on the object is divided into a light flux $\Phi La$ and a light flux $\Phi Lb$, the former entering a focus detection pixel A through a divided pupil corresponding to the focus detection pixel A and the latter entering a focus detection pixel B through a divided pupil corresponding to the focus detection pixel B.

These light fluxes come from the identical point on the object. Therefore, when the image-pickup optical system is in an in-focus state, they pass through the same microlens and reach one point on the image-pickup element as shown in FIG. 12A. Accordingly, the image signals respectively obtained from the lines containing the first focus detection pixels A (S1) and second focus detection pixels B (S2) match with each other.

On the other hand, as shown in FIG. 12B, when the image-pickup optical system is out of focus by x, the reaching positions of both light fluxes $\Phi La$ and $\Phi Lb$ are offset from each other by a change in the incident angle of the light fluxes $\Phi La$ and $\Phi Lb$ onto the microlenses. Therefore, a phase difference is generated between the image signals respectively obtained from the lines containing the first focus detection pixels A (S1) and second focus detection pixels B (S2).

The image-pickup apparatus disclosed in Japanese Patent Laid-Open No. 2000-156823 performs the focus detection with the image-pickup element utilizing the above principle.

In addition, Japanese Patent Laid Open No. 2001-305415 discloses an image-pickup apparatus which can switch a focus control method between a phase difference detection method and a contrast detection method by using an image-pickup element similar to the image-pickup elements disclosed in Japanese Patent Laid Open No. 2000-156823. This image-pickup apparatus selects and performs focus control suited for respective detections of a horizontal line and a vertical line as an object.

When performing focus control with the contrast detection method as in the image-pickup apparatus disclosed in Japanese Patent Laid Open No. 2001-305415, contrast evaluation may be inaccurate if noise contaminates a brightness signal obtained by photoelectric conversion of an object image. In order to suppress such an adverse influence due to the noise contamination, it is preferable to improve an S/N ratio of the contrast evaluation by setting a great number of sample positions (or areas) for performing contrast evaluation in an image-pickup range and integrating the evaluation results with these sample positions.

However, if the number of the sample positions is increased, the size of a contrast evaluation area including all of these sample positions will increase. In this case, plural objects at different distances from each other are easily present in the contrast evaluation area simultaneously, and therefore the contrast evaluation may be incorrectly performed due to so-called "near and far objects in the frame".

BRIEF SUMMARY OF THE INVENTION

The present invention provides an image-pickup apparatus capable of performing focus control with a highly accurate contrast detection method by increasing reliability of the contrast evaluation while avoiding incorrect contrast evaluation due to the "near and far objects in the frame", and a control method for the same.

The present invention provides, as an aspect thereof, an image-pickup apparatus including an image-pickup element that includes first type pixels photoelectrically converting an object image formed by a light flux from an image-pickup optical system and second type pixels photoelectrically converting plural images formed by plural light fluxes divided from the light flux from the image-pickup optical system, a controller that performs focus control based on a contrast evaluation using signals from pixels in a contrast evaluation area among the first type pixels, and a phase difference focus detector that detects phase differences of respective pairs of images of the plural images using signals from the second type pixels, the pairs of images being respectively formed in plural phase difference detection areas provided in the contrast evaluation area, and that calculates information on an in-focus position of the image-pickup optical system or object distance for each phase difference detection area based on each phase difference. The controller changes the contrast evaluation area based on the information calculated for the respective phase difference detection areas.

The present invention provides, as another aspect thereof, an image-pickup apparatus including an image-pickup element that includes first type pixels photoelectrically converting an object image formed by a light flux from an image-pickup optical system and second type pixels photoelectrically converting plural images formed by plural light fluxes divided from the light flux from the image-pickup optical system, a controller that performs focus control based on a contrast evaluation using signals from pixels in a contrast evaluation area among the first type pixels, and a phase difference focus detector that detects phase differences of respective pairs of images of the plural images using signals from the second type pixels, the pairs of images being respectively formed in plural phase difference detection areas provided in the contrast evaluation area, and that calculates information on an in-focus position of the image-pickup optical system for each phase difference detection area based on each phase difference. The controller performs the contrast evaluation by moving the focus lens in plural ranges which respectively include the in-focus positions calculated for the plural phase difference detection areas, each of the plural ranges not including the in-focus positions included in other ranges.

The present invention provides, as still another aspect thereof, a control method for an image-pickup apparatus provided with an image-pickup element that includes first type pixels photoelectrically converting an object image formed by a light flux from an image-pickup optical system, and second type pixels photoelectrically converting plural images formed by plural light fluxes divided from the light flux from the image-pickup optical system. The control method includes a step of performing focus control based on a contrast evaluation using signals from pixels in a contrast evaluation area among the first type pixels, a step of detecting phase differences of respective pairs of images of the plural images using signals from the second type pixels, the pairs of images being respectively formed in plural phase difference detection areas provided in the contrast evaluation area, a step of calculating information on an in-focus position of the image-pickup optical system or object distance for each phase difference detection area based on each phase difference, and a step of changing the contrast evaluation area based on the information calculated for the respective phase difference detection areas.

The present invention provides, as further still another aspect thereof, a control method for an image-pickup apparatus provided with an image-pickup element that includes first type pixels photoelectrically converting an object image formed by a light flux from an image-pickup optical system, and second type pixels photoelectrically converting plural images formed by plural light fluxes divided from the light flux from the image-pickup optical system. The control method includes a step of performing focus control based on a contrast evaluation using signals from pixels in a contrast evaluation area among the first type pixels, a step of detecting phase differences of respective pairs of images of the plural images using signals from the second type pixels, the pairs of images being respectively formed in plural phase difference detection areas provided in the contrast evaluation area, a step of calculating information on an in-focus position of the image-pickup optical system for each phase difference detection area based on each phase difference, and a step of performing the contrast evaluation by moving the focus lens in plural ranges which respectively include the in-focus positions calculated for the plural phase difference detection areas, each of the plural ranges not including the in-focus positions included in other ranges.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
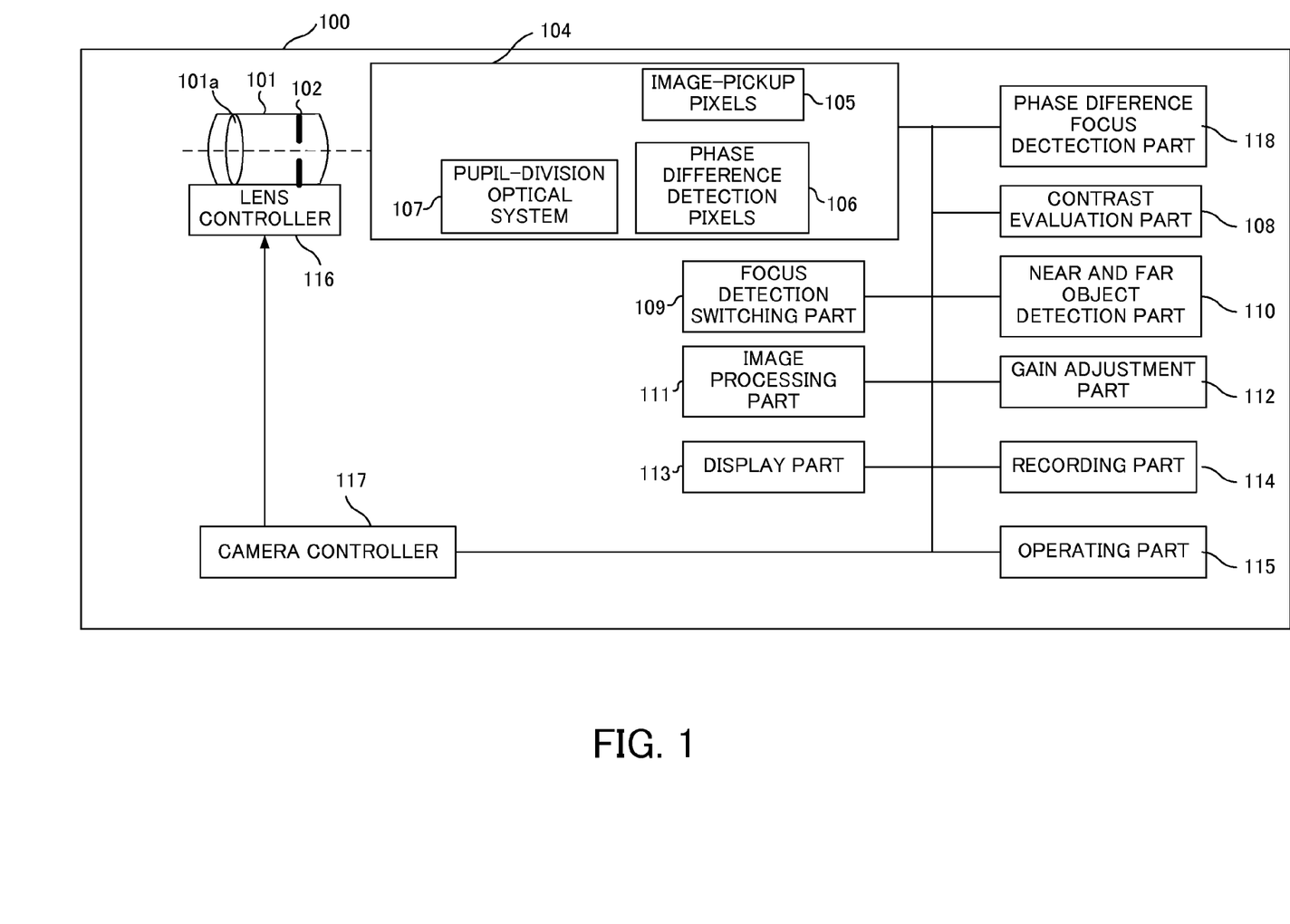
FIG. 1 is a block diagram showing the configuration of a camera that is first and second embodiments (Embodiments 1 and 2) of the present invention.

FIG. 1 shows the configuration of a digital still camera as an image-pickup apparatus that is a first embodiment (Embodiment 1) of the present invention.

The camera 100 includes an image-pickup optical system 101 that forms an object image of an object with a light flux, a lens controller 116 that controls the position of a focus lens 101a included in the image-pickup optical system 101, and an aperture stop 102 that adjusts the amount of light passing through the image-pickup system 101. The camera 100 also includes an image-pickup element 104 as a photoelectric conversion element, which is constituted by a CMOS sensor. The object image formed by the light flux from the image-pickup optical system 101 is formed on a light-receiving surface of the image-pickup element 104.

The image-pickup element 104 includes a group of image-pickup pixels (first type pixels) 105 constituted by plural image-pickup pixels for photoelectrically converting the object image formed by the image-pickup optical system 101, each of the image-pickup pixels respectively having a color filter of one of R, G, and B. The image-pickup pixels 105 output image signals that are used for generating an image of the object. The image-pickup element 104 also includes a group of phase difference detection pixels (second type pixels) 106 that output a pair of image signals (in other words, a pair of images) which is used for phase difference detection, that is, for detection of a focus state of the image-pickup optical system 101. The phase difference detection pixels can be also referred to as focus detection pixels.

The phase difference detection pixels 106 includes plural first phase difference detection pixels and plural second phase difference detection pixels that photoelectrically convert plural light fluxes which are pupil-divided by a pupil-division optical system 107 to be described later. The plural first phase difference detection pixels form a first phase difference sensor, and the plural second phase difference detection pixels form a second phase difference sensor. The first phase difference sensor outputs one of the above-described pair of image signals, and the second phase difference sensor outputs the other one of the above-described pair of image signals.

The image-pickup element 104 also includes the pupil-division optical system 107 for causing the pupil-divided light fluxes of the light flux from the image-pickup optical system 101 to respectively enter the first and second phase difference sensors.

Figure 2:
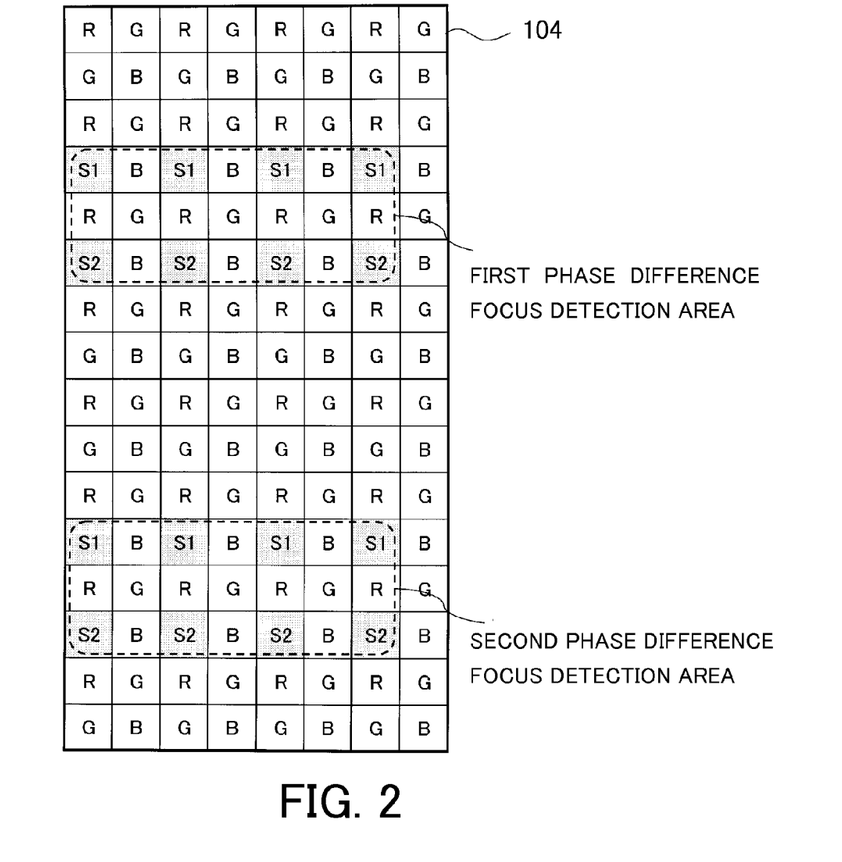
FIG. 2 is a figure showing arrangements of image-pickup pixels and focus detection pixels in Embodiments 1 and 2.

FIG. 2 shows pixel arrangement of the image-pickup element 104 used in this embodiment. In FIG. 2, the first phase difference detection pixels and the second phase difference detection pixels in the phase difference pixels 106 are designated by S1 and S2, respectively.

The structure of the first and second phase difference detection pixels is similar to those shown in FIGS. 10 and 11. That is, the first and second phase difference detection pixels S1 and S2 are configured such that their respective light-shielding layers have apertures at symmetric positions relative to an optical axis of a microlens serving as the pupil-division optical system 107.

In FIG. 2, a pixel line in which the first phase difference detection pixels S1 are discretely inserted forms the first phase difference sensor. A pixel line, which is disposed at a predetermined distance (the distance corresponding to one pixel in FIG. 2) from the first phase difference sensor and in which the second phase difference detection pixels S2 are discretely inserted, forms the second phase difference sensor. One area including the first and second phase difference sensors forms one phase difference focus detection area. In FIG. 2, a first phase difference focus detection area and a second phase difference focus detection area are arranged in an upper part and a lower part of the image-pickup element 104, respectively. However, a more number of the phase difference focus detection areas are provided in an actual image-pickup element 104 as described above.

As shown in FIG. 1, the camera 100 includes a phase difference focus detection part 118 that calculates a phase difference between the pair of image signals output from the first and second phase difference sensors in each phase difference focus detection area using correlation calculation.

Here, "the pair of image signals output from the first and second phase difference sensors (in other words, the pair of image signals output from the phase difference detection pixels 106)" is basically a pair of image signals generated only from the output signals from the phase difference detection pixels S1 and S2. The pair of image signals, however, may be generated from output signals from the entire group of the phase difference detection pixels.

The phase difference focus detection part 118 calculates, based on the phase difference, a defocus amount indicating a focus state of the image-pickup optical system 101 relative to the object whose optical image is formed on the phase difference focus detection area.

Furthermore, the phase difference focus detection part 118 calculates an in-focus position of the focus lens 101a for the phase difference focus detection area based on the defocus amount. In this manner, the phase difference focus detection part 118 individually calculates the in-focus position using the phase difference detection method in each phase difference focus detection area (hereinafter referred to as phase difference in-focus position).

The present embodiment explains that the phase difference focus detection part 118 performs up to the calculation of the phase difference in-focus position. However, the phase difference focus detection part 118 may calculate the phase difference of the image signals, and then a camera controller which will be described later may calculate the defocus amount and the phase difference in-focus position based on the phase difference. In addition, the phase difference focus detection part 118 may calculate the defocus amount, and then the camera controller 117 may calculate the phase difference in-focus position based on the defocus amount. In these cases, the camera controller 117 functions part of a phase difference focus detector.

The camera controller 117 calculates a drive amount of the focus lens 101a for driving the focus lens 101a to the phase difference in-focus position acquired by the phase difference focus detection part 118. The calculated drive amount is output to the lens controller 116. The lens controller 116 includes an actuator such as a motor, and moves the focus lens 101a based on the drive amount. In this manner, focus control with a phase difference detection method (hereinafter referred to as phase difference AF) is performed.

In addition, the camera 100 includes a contrast evaluation part 108 which performs contrast evaluation of an image-pickup signal from the image-pickup pixels 105 (or contrast evaluation of object image data generated by the image-pickup signal [in other words, object image data]). The contrast evaluation part 108 extracts a high frequency component from the image-pickup signal (or image data signal) output by the image-pickup pixels included in a contrast evaluation area (specific area) in the image-pickup element 104, and then generates a contrast evaluation value from the high frequency component. The contrast evaluation value is output to the camera controller 117.

The camera controller 117 acquires plural contrast evaluation values corresponding to plural focus lens positions from the contrast evaluation part 108 while moving (scanning) the focus lens 101a in a direction of an optical axis of the image-pickup optical system via the lens controller 116. The camera controller 117 determines that a focus lens position corresponding to a maximum value among the plural contrast evaluation values is the in-focus position, and then moves the focus lens 101a to this in-focus position (hereinafter referred to as contrast in-focus position). In this way, the control which moves the focus lens 101a to the contrast in-focus position based on the contrast evaluation values is focus control with a contrast detection method (hereinafter referred to as contrast AF).

The camera 100 includes a focus detection switching part 109. The focus detection switching part 109 causes the phase difference focus detection part 118 to calculate the phase difference in-focus position in response to a command from the camera controller 117. In addition, the focus detection switching part 109 causes the contrast evaluation part 108 to generate the contrast evaluation values in response to a command from the camera controller 117.

In addition, the camera 100 includes a near and far object detection part 110. The near and far object detection part 110 calculates differences between the phase difference in-focus positions calculated for plural phase difference focus detection areas included in the contrast evaluation area among all phase difference focus detection areas. This is for the purpose of detecting whether or not plural objects whose distances from the camera 100 are larger than a predetermined value are included in the contrast evaluation area.

Further, the near and far object detection part 110 stores position information (coordinate information) of the phase difference detection areas in a memory (not shown) in advance. The near and far object detection part 110 obtains coordinate information of the contrast evaluation area from the contrast evaluation part 108, and then determines at least one phase difference focus detection area included wholly or partially in the contrast evaluation area based on the coordinate information of the contrast evaluation area and the coordinate information of the phase difference focus detection areas.

Moreover, the near and far object detection part 110 obtains information on the phase difference in-focus position for each phase difference focus detection area in the contrast evaluation area from the phase difference focus detection part 118. The near and far object detection part 110 then determines whether or not the phase difference in-focus positions for the respective phase difference focus detection areas obtained from the phase difference focus detection part 118 have a difference larger than a predetermined value (threshold value). If the phase difference in-focus positions have a larger difference than the predetermined value, a correct in-focus position may not be able to be acquired with the contrast AF because plural objects whose distances from the camera 100 are mutually different are present in the contrast evaluation area, in other words, because of "near and far objects in the frame".

In order to this, the near and far object detection part 110 calculates, when the phase difference in-focus positions for the phase difference focus detection areas in the contrast evaluation area have the difference larger than the predetermined value, a new contrast evaluation area in the following manner.

Specifically, first, the near and far object detection part 110 determines, among the phase difference focus detection areas provided in the contrast evaluation area, a phase difference focus detection area for which the phase difference in-focus position is located closest to a close distance end of a movable range of the focus lens 101a (i.e., where the object is present at a closest position). The phase difference focus detection area for which the phase difference in-focus position is located closest to the close distance end is hereinafter referred to as closest focus detection area.

Next, the near and far object detection part 110 obtains, from the phase difference focus detecting part 118, the coordinate information of the closest focus detection area and the coordinate information of at least one phase difference focus detection area (hereinafter referred to as close focus detection area) for which the phase difference in-focus position has a smaller difference from the phase difference in-focus position for the closest focus detection area than a predetermined value. Then, the near and far object detection part 110 calculates a new contrast evaluation area from the coordinate information of the closest focus detection area and the coordinate information of the at least one phase difference focus detection area.

The new contrast evaluation area is set such that it includes the closest focus detection area and the close focus detection area, but does not include the other phase difference focus detection areas. Here, "include" and "not include" means including or not including the entirety of the phase difference focus detection area. In other words, cases in which a small part of the phase difference focus detection area is not included or in which only a small part is included are regarded as "not included."

In this manner, the near and far object detection part 110 sets a new contrast evaluation area such that it includes the closest focus detection area and close focus detection area for which the phase difference in-focus positions are located at a closer distance side than those for the other phase difference focus detection areas.

After setting the new contrast evaluation area (in other words, after changing the contrast evaluation area), the near and far object evaluation part 110 outputs coordinate information of the new contrast evaluation area in which the "near and far objects in the frame" is suppressed to the contrast evaluation part 108. The contrast evaluation part 108 extracts a high frequency component from the image-pickup signals output from the image-pickup pixels 105 included in the new contrast evaluation area, and then generates a contrast evaluation value from the high frequency component.

The new contrast evaluation area becomes a focusing target area for acquiring a final in-focus position using the contrast evaluation value generated in the new contrast evaluation area. In other words, near and far object detection part 110 sets a new contrast evaluation area which becomes the focusing target area by the contrast AF in the contrast evaluation area before change, based on the information on the phase difference in-focus positions from the phase difference focus detection part 118.

In this way, in the present embodiment, the near and far object detection part 110 detects the presence or absence of the "near and far objects in the frame" based on the phase difference in-focus positions of the phase difference focus detection areas included in the contrast evaluation area. Then, if the "near and far objects in the frame" is detected, the near and far object detection part 110 calculates and sets a new contrast evaluation area where the "near and far objects in the frame" can be suppressed.

The contrast evaluation part 108, the focus detection switching part 109, the near and far object detection part 110 and the camera controller 117 constitute a controller.

The camera 100 includes an image processing part 111 that performs image processing to the image signals output from the image-pickup pixels 105 such as gamma correction, white balance adjustment, resampling for display, image compression encoding.

The camera 100 includes a gain adjustment part (gain adjuster) 112. In each of the phase difference detection pixels 106 (first and second phase difference pixels S1 and S2), a viewing field is limited by the light-shielding layer provided to each phase difference detection pixel and no color filter is provided, as can be seen from FIGS. 10 and 11. Therefore, the level of the image signals from the phase difference detection pixels 106 is different from (for example, lower than) that of the image signals output from plural pixels of the image-pickup pixels 105 located in the vicinity of the phase difference detection pixels 106 (hereinafter referred to as "adjacent pixels").

Accordingly, the gain adjustment part 112 adjusts a gain for the image signals from the phase difference detection pixels 106 in order to make the level of the image signals from the phase difference detection pixels 106 closer to that of the image signals from the adjacent pixels.

Furthermore, the camera 100 includes a display part 113 for displaying image data (still image data) output from the image processing part 111, and a recording part 114 for recording the image data on a recording medium such as a semiconductor memory or an optical disk. The camera 100 further includes an operating part 115 that enables a user to perform input operations.

Figure 3:
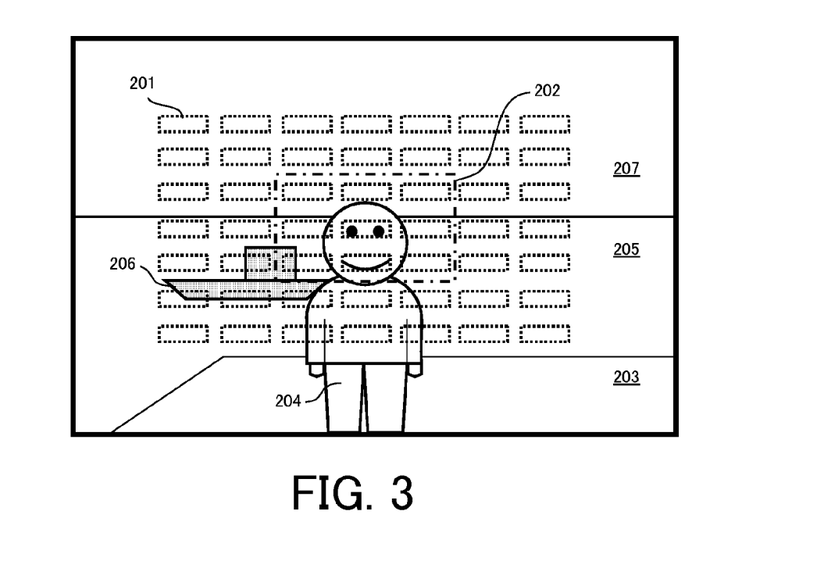
FIG. 3 is a schematic view showing a positional relationship between a contrast evaluation area and phase difference detection areas in Embodiments 1 and 2.

FIG. 3 schematically shows a positional relationship between the contrast evaluation area and the phase difference focus detection areas on the image-pickup element 104. On the image-pickup element 104, various images of near and far objects such as a ground 203, a person 204, an ocean 205, a boat 206, and a sky 207 are formed. Further, FIG. 3 also shows viewing fields of the contrast evaluation area and the phase difference focus detection areas when viewing the objects from the image-pickup element 104.

Dotted-line rectangular areas 201 which are horizontally long represent the phase difference focus detection areas. Further, dashed-dotted-line rectangular area 202 represents the contrast evaluation area. The size and position of the contrast evaluation area 202 can be set arbitrarily by a user through the operating part 115 or automatically by the contrast evaluation part 108. The contrast evaluation area 202 is set such that its size can secure an S/N ratio which can sufficiently perform the contrast evaluation and plural phase difference focus detection areas 201 are included therein.

In the state shown in FIG. 3, images of a face of the person 204, a portion of the ocean 205, and portions of the boat 206 and the sky 207 as object images are formed in the contrast evaluation area 202, which have mutually different distances. Therefore, the contrast in-focus position of the face of the person 204 may not be correctly acquired due to the "near and far objects in the frame".

Figure 4:
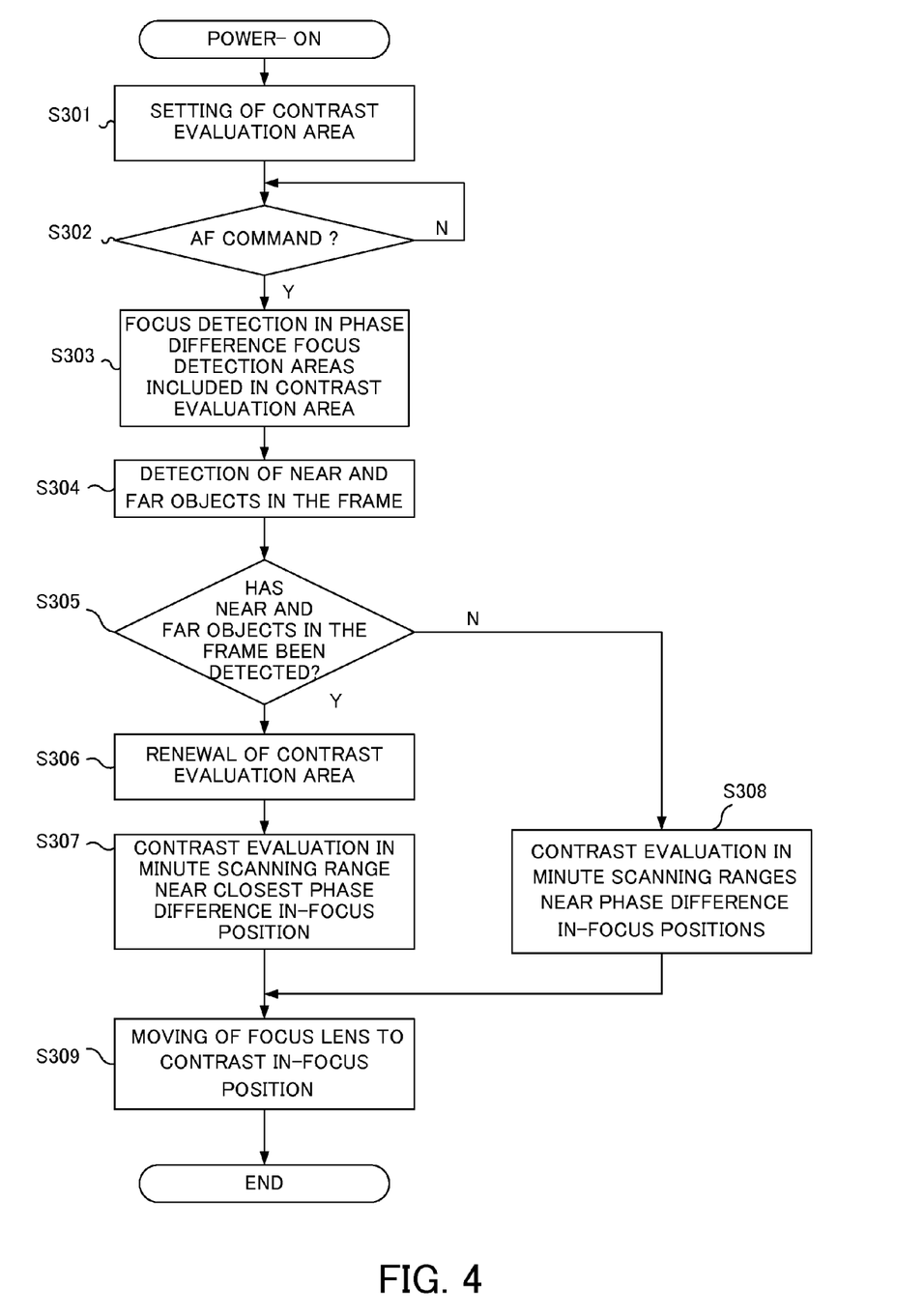
FIG. 4 is a flowchart showing operations of the camera of Embodiment 1.

FIG. 4 shows an AF operation of the camera 100 (mainly the contrast evaluation part 108, the near and far object detection part 110, and the camera controller 117) of the present embodiment. This AF operation is performed in accordance with a computer program which is stored in a memory (not shown) provided in the camera controller 117. The same is applied to an AF operation in another embodiment which will be described later.

The camera controller 117 starts the AF operation from step S301 when a power switch (not shown) disposed in the operating part 115 is turned on. Although not specifically explained here, an image-pickup preparation operation including an exposure calculation is performed along with the AF operation.

In step S301, the camera controller 117 causes the contrast evaluation part 108 to set the contrast evaluation area automatically or in response to an input from the operating part 115. Afterwards, the operation proceeds to step S302.

In step S302, the camera controller 117 determines whether or not an AF command (for example, a signal output in response to a half-press operation of a release button) has been input from the operating part 115. If the AF command has not been input, this step is repeated. If the AF command has been input, then the operation proceeds to step S303.

In step S303, the camera controller 117 causes, via the focus detection switching part 109, the phase difference focus detection part 118 to calculate the phase difference in-focus positions of the plural phase difference focus detection areas included in the contrast evaluation area set in step S301.

Figure 5:
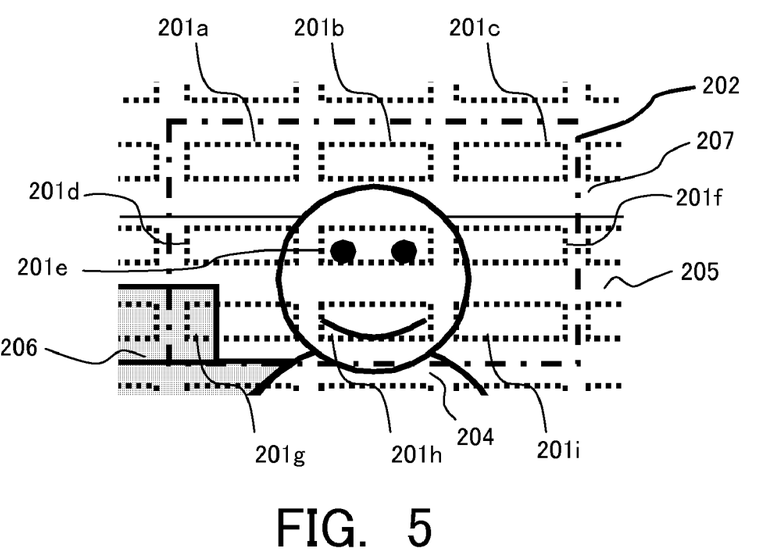
FIG. 5 is a partially expanded view of FIG. 3.

When the contrast evaluation area 202 has been set as shown in FIG. 3, the phase difference in-focus positions of nine phase difference focus detection areas 201a to 201i which are shown in FIG. 5 and included in the contrast evaluation area 202 are calculated.

In the example of FIG. 5, the phase difference in-focus position corresponding to the face of the person 204 which is located at a close (closest) distance for the phase difference focus detection area 201e is calculated. Further, the phase difference in-focus positions corresponding to the sky 207 and ocean 205 which are located at far distances for the phase difference focus detection areas 201a to 201c, 201d, 201f, and 201i, are calculated. Moreover, for the phase difference focus detection area 201g, the phase difference in-focus position corresponding to the boat 206 which is located at a middle distance is calculated. Afterwards, the operation proceeds to step S304.

In step S304, the camera controller 117 causes the near and far object detection part 110 to detect whether or not the phase difference in-focus positions for the respective phase difference focus detection areas acquired in step S303 (i.e., the distances of the objects) have a difference larger than a predetermined value, in other words, to detect the presence or absence of the "near and far objects in the frame".

In step S305, the camera controller 117 determines whether or not the detection of the "near and far objects in the frame" has been made. If the detection has been made, the operation proceeds to step S306. If the detection has not been made, the operation proceeds to step S308.

In step S306, the camera controller 117 causes the near and far object detection part 110 to select the above-described closest focus detection area and the close focus detection area among the phase difference focus detection areas 201a to 201i. Then, the camera controller 117 causes the near and far object detection part 110 to calculate a new contrast evaluation area narrower than the original contrast evaluation area set in step S301 such that the new contrast evaluation area includes the closest focus detection area and the close focus detection area, but does not include the other phase difference focus detection areas. Thereby, the contrast evaluation part 108 updates (changes) the contrast evaluation area from the original contrast evaluation area that had been set up to this point to the new contrast evaluation area calculated by the near and far object detection part 110.

Figure 6:
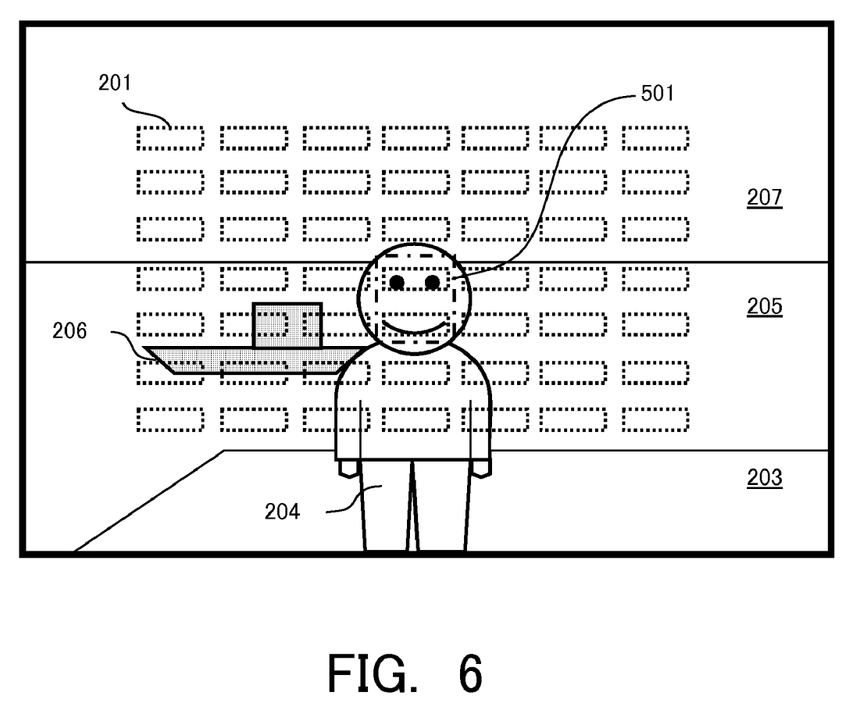
FIG. 6 is a schematic view showing a changed contrast evaluation area in Embodiment 1.

FIG. 6 shows the contrast evaluation area 501 after the update (hereinafter referred to as the updated [changed] contrast evaluation area) in a case where the closest focus detection area is the phase difference focus detection area 201e and the close focus detection area is the phase difference focus detection area 201h among the phase difference focus detection areas 201a to 201i shown in FIG. 5. Although FIG. 6 shows a case where there is one close focus detection area, there may be plural close focus detection areas. In this case, the updated contrast evaluation area includes the closest focus detection area and the plural close focus detection areas.

In the example of FIG. 6, since the updated contrast evaluation area is set to be narrower than the original contrast evaluation area such that the updated contrast evaluation area includes only the closest and close focus detection areas, the "near and far objects in the frame" between the face of the person 204 located at the closest distance and the ocean 205 located in the background can be avoided. After the update of the contrast evaluation area, the operation proceeds to step S307.

In step S307, the camera controller 17 moves the focus lens 101a within a range near (including) the phase difference in-focus position closest to the close distance end for the closest focus detection area. The range is a predetermined minute operation range including the phase difference in-focus position, the range being hereinafter referred to as minute scanning range. Prior to this, the camera controller 117 may move the focus lens 101a to the phase difference in-focus position closest to the close distance end with the phase difference AF.

Then, the camera controller 17 moves (scans) the focus lens 101a in the minute scanning range to acquire the contrast evaluation value from the contrast evaluation part 108. The minute scanning range is a range significantly narrower than the entire movable range of the focus lens 101a from an infinite distance end to the close distance end. For example, the minute scanning range is defined as a defocus range centering on the above-mentioned phase difference in-focus position closest to the close distance end and having a width of approximately 1Fδ on each of the infinite and close distance end sides, based on a focal depth calculated from an aperture value F of the aperture stop 102 and a permissible confusion circle diameter δ. When the contrast evaluation values corresponding to respective focus lens positions in the minute scanning range are acquired, the operation proceeds to step S309.

On the other hand, if the "near and far objects in the frame" is not detected in step S305 and then the operation proceeds to step S308, the camera controller 117 performs the following operations. The camera controller 117 moves the focus lens 101a within ranges each including the phase difference in-focus position for each phase difference focus detection area (201a to 201i) calculated in step S303 to acquire the contrast evaluation values in the respective ranges from the contrast evaluation part 108. In this way, the movement of the focus lens 101a within the minute scanning ranges including the phase difference in-focus positions of all of the phase difference focus detection areas 201a to 201i present in the contrast evaluation area 202 and the acquisition of the contrast evaluation values in the minute scanning ranges are performed. Then, the operation proceeds to step S309.

In step S309, the camera controller 117 determines the final contrast in-focus position based on the contrast evaluation values acquired in step S307 or step S308, and then moves the focus lens 101a to this final contrast in-focus position.

The AF operation described above can avoid a reduction in focusing accuracy due to the "near and far objects in the frame" in the contrast AF and can avoid an increase in time required until an in-focus state is acquired. Further, since the contrast evaluation is performed by moving the focus lens 101a within only a range near the in-focus position acquired by the phase difference detection method, deterioration of contrast evaluation performance can be suppressed even if a reduction in the S/N ratio occurs due to the narrowing of the contrast evaluation area. Thereby, an incorrect operation of the contrast AF due to the "near and far objects in the frame" can be suppressed while maintaining a high reliability of the contrast evaluation, and thus a highly accurate in-focus state can be acquired.

The present embodiment has explained the case in which the information on the phase difference in-focus positions of the focus lens 101a for the respective phase difference focus detection areas is calculated and the contrast evaluation area is changed based on this information on the phase difference in-focus positions. However, a distance to an object which should be focused on can be calculated based on the phase difference in-focus position and information on positions of other lenses, such as a magnification-varying lens, constituting the image-pickup optical system. Therefore, instead of the phase difference in-focus position, information of object distances for the respective phase difference focus detection area may be calculated, and the contrast evaluation area may be changed based on this information of the object distances. An in-focus position closer to the close distance end corresponds to a shorter object distance.

Embodiment 2

In Embodiment 1, the contrast evaluation area is changed such that it includes only the phase difference focus detection areas for which the phase difference in-focus positions are located at the closer distance side among the phase difference focus detection areas included in the original contrast evaluation area. Further, the range (minute scanning range) within which the focus lens 101a is moved for the contrast evaluation in the changed contrast evaluation area is set to a range near (including) the phase difference in-focus position located closest to the close distance end.

In contrast, in the present embodiment, the focus lens 101a is moved in ranges (minute scanning ranges) near (including) the phase difference in-focus positions of the plural phase difference focus detection areas included in the contrast evaluation area which is the original contrast evaluation area or the changed contrast evaluation area described in Embodiment 1. Thereby, the contrast evaluation is performed only in distance ranges corresponding to the respective minute scanning ranges. In other words, the contrast evaluation is performed discretely.

Figure 8A:
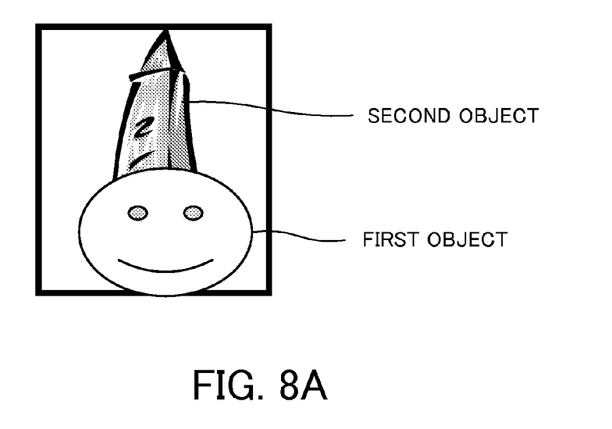
FIG. 8A is an explanatory diagram showing an object picked up using the camera of Embodiment 2.

This embodiment is effective to a case where, as shown in FIG. 8A, plural objects exists at mutually different distances, but at roughly similar distances. In FIG. 8A, a first object exists in a bottom portion of the contrast evaluation area, and a second object exists in a top portion thereof.

When the contrast evaluation is performed foe the plural objects located at similar distances, a contrast evaluation value is obtained which corresponds to a total value of the contrast evaluation values obtained by the contrast evaluation for the respective objects. If a difference in distance of the plural objects is small, a peak of the total contrast evaluation value (contrast evaluation value finally obtained) appears at a centroid position of the distances of the plural objects.

However, if focusing on the centroid position of the distances of the plural objects is performed, under an image-pickup condition in which a depth of field is shallow, an image will be obtained which is not accurately focused on the object (for example, a focusing target object present at a close distance side). In other words, an inadequacy due to the "near and far objects in the frame" may occur even between plural objects whose difference in distances is small.

Figure 8B:
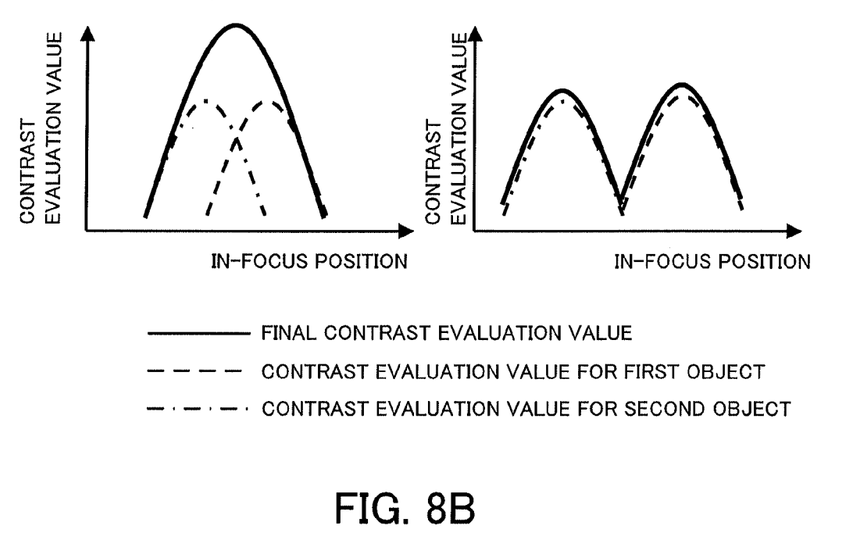
FIG. 8B is an explanatory diagram of Embodiment 2.

Therefore, in this embodiment, the contrast evaluation is not performed in a wide viewing field in which the peak of the total contrast evaluation value may appear at the centroid position of the distances of the plural objects, but is performed in narrow viewing fields respectively including only each object. In other words, the contrast evaluation is performed in plural minute scanning ranges each including the phase difference in-focus position calculated for each phase difference detection areas and not including the phase difference in-focus positions included in other minute scanning ranges. Further, in other words, the contrast evaluation is performed in each minute scanning range near each phase difference in-focus position calculated for each object. Thereby, as shown on the right of FIG. 8B, the contrast evaluation value for each object is accurately acquired as a final contrast evaluation value, and a final in-focus position (contrast in-focus position) is determined based on heights or the like of the peaks of these contrast evaluation values.

The AF operation in this embodiment is carried out in a camera 100 which has a configuration in which the near and far object detection part 110 is removed from the camera 100 of Embodiment 1. In this embodiment, constituent components identical to those described in Embodiment 1 are denoted by the same reference numerals as those in Embodiment 1.

Figure 7:
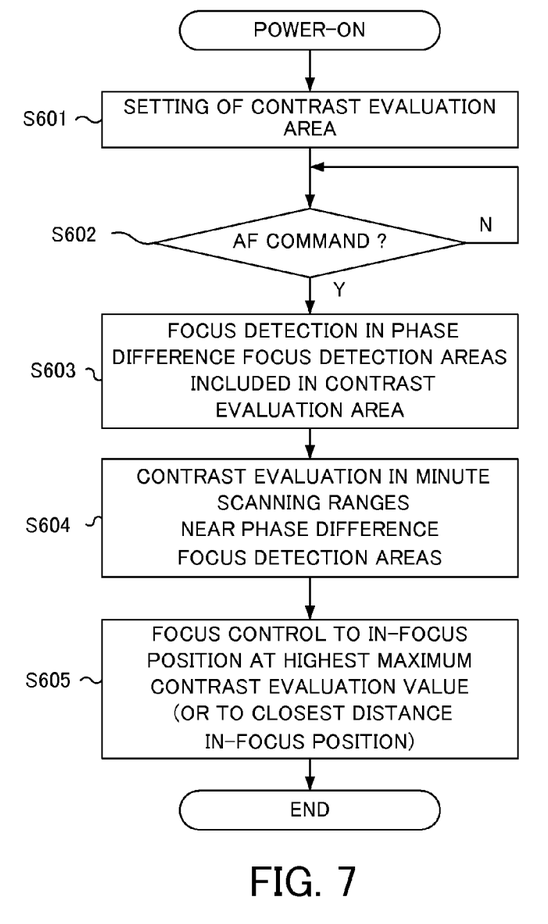
FIG. 7 is a flowchart showing operations of the camera of Embodiment 2.

The flow chart in FIG. 7 shows an AF operation in this embodiment.

The camera controller 117 starts the AF operation from step S601 when a power switch (not shown) disposed in the operating part 115 is turned on. Although not specifically explained here, an image-pickup preparation operation including an exposure calculation is performed along with the AF operation.

In step S601, the camera controller 117 causes the contrast evaluation part 108 to set the contrast evaluation area automatically or in response to an input from the operating part 115. Afterwards, the operation proceeds to step S602.

In step S602, the camera controller 117 determines whether or not an AF command (for example, a signal output in response to a half-press operation of a release button) has been input from the operating part 115. If the AF command has not been input, this step is repeated. If the AF command has been input, then the operation proceeds to step S603.

In step S603, the camera controller 117 causes, via the focus detection switching part 109, the phase difference focus detection part 118 to calculate phase difference in-focus positions of plural phase difference focus detection areas included in the contrast evaluation area set in step S601.

Next, in step S604, the camera controller 117 moves the focus lens 101a within ranges near the respective phase difference in-focus positions acquired in step S603 (predetermined minute operation ranges each including the phase difference in-focus position, hereinafter being referred to as minute scanning ranges) for the plural phase difference focus detection areas. In other words, as explained before, the camera controller 117 moves the focus lens 101a in the plural minute scanning ranges each including the phase difference in-focus position calculated for each phase difference detection areas and not including the phase difference in-focus positions included in other minute scanning ranges. Each minute scanning range may partially overlap with another minute scanning range as long as the each minute scanning range does not include the phase difference in-focus position of the other minute scanning range. Then, the camera controller 117 moves (scans) the focus lens 101a within each minute scanning range to acquire contrast evaluation value from the contrast evaluation part 108.

The minute scanning range in this embodiment is also a range significantly narrower than the entire movable range of the focus lens 101a from an infinite distance end to the close distance end. For example, the minute scanning range is defined as a defocus range centering on the above-mentioned phase difference in-focus position closest to the close distance end and having a width of approximately 1Fδ on each of the infinite and close distance end sides, based on a focal depth calculated from an aperture value F of the aperture stop 102 and a permissible confusion circle diameter δ.

When the contrast evaluation value in each minute scanning range is acquired, the operation proceeds to step S605.

In step S605, the camera controller 117 moves the focus lens 101a to a position (final contrast in-focus position) corresponding to a maximum value of the contrast evaluation value which is a highest maximum value among maximum values of the contrast evaluation values in the plural minute scanning ranges acquired in step S604. If two or more contrast evaluation values whose maximum values are at the same level exist, that is, if two or more objects exist, the camera controller 117 moves the focus lens 101a to a position corresponding to the maximum value of the contrast evaluation value for the closest object among the two or more objects.

The above AF operation performs the contrast evaluation by moving the focus lens 101a in the plural minute scanning ranges near the respective phase difference in-focus positions for the plural phase difference focus detection areas. In other words, even if the contrast evaluation area is wide, the contrast evaluation is performed in only minute scanning ranges near the phase difference in-focus positions. This can prevent a centroid position of the distances of the plural objects from being determined as the contrast in-focus position, and can accurately focus on a focusing target object (for example, an object at a closest distance) among the plural objects. Thereby, the "near and far objects in the frame" can be suppressed, and thus a highly accurate in-focus state can be acquired.

As described above, according to each of Embodiments 1 and 2, since the contrast evaluation area is changed based on the phase difference in-focus positions of the image-pickup optical system calculated for the respective phase difference focus detection areas, cases where plural objects at mutually different distances enter the changed contrast evaluation area can be reduced. Thereby, influences of the "near and far objects in the frame" can be suppressed while maintaining a high reliability of the contrast evaluation, and as a result, highly accurate focus control with the contrast detection method can be performed.

In addition, according to each of Embodiments 1 and 2, the contrast evaluation is performed by moving the focus lens in the plural minute scanning ranges each including the phase difference in-focus position calculated for each phase difference focus detection area and not including the phase difference in-focus positions included in the other minute scanning ranges. Therefore, in each minute scanning range, a contrast evaluation result can be obtained for only an object located in a narrow distance range corresponding to that scanning range. This can prevent focus control with the contrast detection method from being performed on a position between the focusing target object and objects other than the focusing target object (objects at a different distance from the focusing target object). Thus, the camera can accurately focus on the focusing target object.

Furthermore, the present invention is not limited to these embodiments and various variations and modifications may be made without departing from the scope of the present invention.

This application claims the benefit of Japanese Patent Application No. 2007-285972, filed on Nov. 2, 2007, which is hereby incorporated by reference herein in its entirety.

What is claimed is:

1. An image-pickup apparatus comprising:
an image-pickup element that includes first type pixels photoelectrically converting an object image formed by a light flux from an image-pickup optical system, and second type pixels photoelectrically converting plural images formed by plural light fluxes divided from the light flux from the image-pickup optical system;
a controller that performs focus control based on a contrast evaluation using signals from pixels in a contrast evaluation area among the first type pixels; and
a phase difference focus detector that detects phase differences of respective pairs of images of the plural images using signals from the second type pixels, the pairs of images being respectively formed in plural phase difference detection areas provided in the contrast evaluation area, and that calculates information on an in-focus position of the image-pickup optical system or object distance for each phase difference detection area based on each phase difference;
wherein the controller changes the contrast evaluation area based on the information calculated for the respective phase difference detection areas.

2. The image-pickup apparatus according to claim 1, wherein the controller changes the contrast evaluation area such that the changed contrast evaluation area includes a phase difference detection area for which the in-focus position is located at a closer distance side than those for the other phase difference detection areas or in which the object distance is shorter than those in other phase difference detection areas, and such that the changed contrast evaluation area does not include the other phase difference detection areas.

3. The image-pickup apparatus according to claim 1, wherein the controller performs the contrast evaluation by moving a focus lens included in the image-pickup optical system, and
wherein the controller performs the contrast evaluation in the changed contrast evaluation area by moving the focus lens in a range which is narrower than a moveable range of the focus lens, the narrower range including the in-focus position of the image-pickup optical system calculated for one of the plural phase difference detection areas included in the changed contrast evaluation area.

4. The image-pickup apparatus according to claim 1, wherein the controller performs the contrast evaluation by moving a focus lens included in the image-pickup optical system, and
wherein the controller performs the contrast evaluation in the changed contrast evaluation area by moving the focus lens in plural ranges which respectively include the in-focus positions calculated for phase difference detection areas included in the changed contrast evaluation area, each of the plural ranges not including the in-focus positions included in other ranges.

5. The image-pickup apparatus according to claim 1, wherein the controller changes the contrast evaluation area and performs the contrast evaluation in the changed contrast evaluation area when a difference between the in-focus positions or the object distances calculated for the respective phase difference detection areas is larger than a predetermined value, and the controller does not change the contrast evaluation area and performs the contrast evaluation in the unchanged contrast evaluation area when the difference is smaller than the predetermined value.

6. An image-pickup apparatus comprising:
an image-pickup element that includes first type pixels photoelectrically converting an object image formed by a light flux from an image-pickup optical system, and second type pixels photoelectrically converting plural images formed by plural light fluxes divided from the light flux from the image-pickup optical system;
a controller that performs focus control based on a contrast evaluation using signals from pixels in a contrast evaluation area among the first type pixels; and
a phase difference focus detector that detects phase differences of respective pairs of images of the plural images using signals from the second type pixels, the pairs of images being respectively formed in plural phase difference detection areas provided in the contrast evaluation area, and that calculates information on an in-focus position of the image-pickup optical system for each phase difference detection area based on each phase difference;
wherein the controller performs the contrast evaluation by moving the focus lens in plural ranges which respectively include the in-focus positions calculated for the plural phase difference detection areas, each of the plural ranges not including the in-focus positions included in other ranges.

7. A control method for an image-pickup apparatus provided with an image-pickup element that includes first type pixels photoelectrically converting an object image formed by a light flux from an image-pickup optical system, and second type pixels photoelectrically converting plural images formed by plural light fluxes divided from the light flux from the image-pickup optical system, the control method comprising the steps of:
performing focus control based on a contrast evaluation using signals from pixels in a contrast evaluation area among the first type pixels;
detecting phase differences of respective pairs of images of the plural images using signals from the second type pixels, the pairs of images being respectively formed in plural phase difference detection areas provided in the contrast evaluation area;
calculating information on an in-focus position of the image-pickup optical system or object distance for each phase difference detection area based on each phase difference; and
changing the contrast evaluation area based on the information calculated for the respective phase difference detection areas.

8. A control method for an image-pickup apparatus provided with an image-pickup element that includes first type pixels photoelectrically converting an object image formed by a light flux from an image-pickup optical system, and second type pixels photoelectrically converting plural images formed by plural light fluxes divided from the light flux from the image-pickup optical system, the control method comprising the steps of:

performing focus control based on a contrast evaluation using signals from pixels in a contrast evaluation area among the first type pixels;

detecting phase differences of respective pairs of images of the plural images using signals from the second type pixels, the pairs of images being respectively formed in plural phase difference detection areas provided in the contrast evaluation area;

calculating information on an in-focus position of the image-pickup optical system for each phase difference detection area based on each phase difference; and performing the contrast evaluation by moving the focus lens in plural ranges which respectively include the in-focus positions calculated for the plural phase difference detection areas, each of the plural ranges not including the in-focus positions included in other ranges.

* * * * *